United States Patent
Syed et al.

(10) Patent No.: US 9,075,141 B2
(45) Date of Patent: Jul. 7, 2015

(54) MINI-MAP-MATCHING FOR NAVIGATION SYSTEMS

(75) Inventors: Qutub Salman Syed, Fountain Valley, CA (US); Jaime B. Colley, Laguna Niguel, CA (US); Stefan Witanis, San Jose, CA (US); Terence Douglas Macaulay, Oceanside, CA (US)

(73) Assignee: CAMBRIDGE SILICON RADIO LIMITED, Cambridge (GB)

( * ) Notice: Subject to any disclaimer, the term of this patent is extended or adjusted under 35 U.S.C. 154(b) by 65 days.

(21) Appl. No.: 13/315,202

(22) Filed: Dec. 8, 2011

(65) Prior Publication Data

US 2013/0151146 A1   Jun. 13, 2013

(51) Int. Cl.
*G01S 19/49* (2010.01)
*G01C 21/32* (2006.01)
*G01S 19/40* (2010.01)
*G01C 21/30* (2006.01)

(52) U.S. Cl.
CPC .............. *G01S 19/40* (2013.01); *G01C 21/32* (2013.01); *G01C 21/30* (2013.01); *G01S 19/49* (2013.01)

(58) Field of Classification Search
CPC .............................. G01C 21/30; G01C 21/32
USPC .................. 701/446, 468, 469, 472, 461, 466
See application file for complete search history.

(56) References Cited

U.S. PATENT DOCUMENTS

| | | | |
|---|---|---|---|
| 7,315,259 B2* | 1/2008 | Sacks | 340/995.1 |
| 7,756,639 B2* | 7/2010 | Colley et al. | 701/446 |
| 7,831,389 B2* | 11/2010 | Yamada | 701/412 |
| 8,103,441 B2* | 1/2012 | Callaghan et al. | 701/457 |
| 8,271,190 B2* | 9/2012 | Smartt | 701/409 |
| 8,442,763 B2* | 5/2013 | Tuck et al. | 701/446 |
| 2004/0181335 A1 | 9/2004 | Kim et al. | |
| 2005/0134503 A1 | 6/2005 | Colley | |

(Continued)

FOREIGN PATENT DOCUMENTS

| | | |
|---|---|---|
| EP | 0921509 | 6/1999 |
| GB | 2481275 | 12/2011 |

(Continued)

OTHER PUBLICATIONS

Scott, Craig A., "Improved GPS Positioning for Motor Vehicles Through Map Matching", paper presented at ION-94, Sep. 20-23, 1994, pp. 1-10.

(Continued)

*Primary Examiner* — John R Olszewski
*Assistant Examiner* — Todd Melton
(74) *Attorney, Agent, or Firm* — Pillsbury Winthrop Shaw Pittman LLP

(57) ABSTRACT

The present invention uses a map database which is created with the view of optimization in terms of size and complexity, so that it can be easily embedded into a navigation chip. The optimized map database is referred to as a "mini-map" database. The mini-map database easily integrates with the position calculation routine. The algorithm for position calculation includes a map-matching component, which is referred to as the "mini-map-matching" (MMM) algorithm, which is implemented on the navigation chip. Application of the present invention includes any navigation system for vehicles and/or pedestrians. The navigation system may include an inertial sensor, such as a dead-reckoning (DR) sensor, for further improvement in calculated positional accuracy when satellite signals are degraded due to environmental factors.

20 Claims, 7 Drawing Sheets

(56) References Cited

U.S. PATENT DOCUMENTS

2011/0241935 A1    10/2011  Miocinovic et al.
2011/0257885 A1*   10/2011  Tuck et al. .................... 701/214
2011/0313648 A1*   12/2011  Newson et al. ............... 701/200

FOREIGN PATENT DOCUMENTS

| GB | 2494977     | 3/2013  |
| JP | 2005-326196 | 11/2005 |
| JP | 2005326196  | 11/2005 |

OTHER PUBLICATIONS

Syed. Selman et al., "Map-Aided GPS Navigation", *GPS World*, Nov. 1, 2005, pp. 1-5, downloaded Dec. 8, 2011.

Search Report issued May 21, 2013 in corresponding British matter.

* cited by examiner

MINI-MAP-MATCHING FOR NAVIGATION SYSTEMS

FIELD OF THE INVENTION

The present invention is related to positioning systems, and more particularly, to a method and apparatus of integrating a map-matching algorithm accessing a reduced size of map database with a navigational routine.

BACKGROUND OF THE INVENTION

With the development of radio and space technologies, several satellites based navigation systems (i.e. satellite positioning system or "SPS") have already been built and more will be in use in the near future. SPS receivers, such as, for example, receivers using the Global Positioning System ("GPS"), also known as NAVSTAR, have become commonplace. Other examples of SPS systems include but are not limited to the United States ("U.S.") Navy Navigation Satellite System ("NNSS") (also known as TRANSIT), LORAN, Shoran, Decca, TACAN, NAVSTAR, the Russian counterpart to NAVSTAR known as the Global Navigation Satellite System ("GLONASS") and any future Western European SPS such as the proposed "Galileo" program. The U.S. GPS system was built and is operated by the United States Department of Defense. The system uses twenty-four or more satellites orbiting the earth at an altitude of about 11,000 miles with a period of about twelve hours. These satellites are placed in six different orbits such that at any time a minimum of six satellites are visible at any location on the surface of the earth except in the polar region. Each satellite transmits a time and position signal referenced to an atomic clock. A typical GPS receiver locks onto this signal and extracts the data contained in it. Using signals from a sufficient number of satellites, a GPS receiver can calculate its position, velocity, altitude, and time. In this application, we use the term Navigation Satellite System (NSS) to encompass any type of satellite-based communication system used for navigation, specifically terrestrial navigation, by a GPS receiver. The GPS receiver is typically included in a navigation device, that may be personal navigation device (PND).

Improving the positional accuracy calculated by a navigation device becomes more of a necessity in environments where satellite signals are degraded, and, as a result, the GPS receiver frequently encounters problems in locking onto the signals that are needed for the calculation of position, velocity, altitude, and time. In a degraded signal environment (e.g., a signal environment where signal strength is below 28 dBHz), satellite signals can be weak or otherwise difficult for GPS receivers to lock on to. Degraded signal environments are often encountered in urban areas, such as cities with many tall buildings. A city with many tall buildings contains "urban canyons", which are environments where streets cut through dense blocks of structures such as skyscrapers. In urban canyons, satellite signals are frequently not visible or are degraded due to the signals being partially or fully blocked by buildings, for example. Consequently, the problem of inaccurate position calculations by GPS receivers in degraded signal environments is especially acute in urban areas, which not only has tall structures, but also has underground infrastructure, such as subway trains, tunnels, underpasses, underground parking lots, basements etc. Known measurement errors in degraded signal environment includes multi-path errors, cross-correlation errors, etc., which in turn translate to navigation errors.

In some conventional systems and methods, dead-reckoning (DR) sensors are integrated with a GPS receiver to augment the satellite-signal based position calculation. One such example is described in co-owned U.S. Pat. No. 7,756,639, entitled, "System and Method for Augmenting a Satellite-Based Navigation Solution," to Colley et al. However, integrated GPS/DR systems also have limitations due to long-term growth of DR errors and dependence of DR sensors on external conditions.

One way to improve the accuracy of a calculated GPS position (with or without DR sensor) is to make accuracy improvements with the aid of a map database. Some attempts have been made to provide cartography information from this map database back to the GPS receiver in real-time to aid in the receiver's navigation solution. However, many of the conventional approaches use a full-fledged map-matching procedure, which is usually performed outside the navigation receiver. External map matching with a feedback to the navigation chip is possible, but may not be the optimal solution due to interface and cost issues. There is a possibility that only limited information can be exchanged across the interface. Also, in most cases, navigation vendors have worked independent of vendors who provide mapping databases, leaving room for further integration.

Co-pending co-owned U.S. patent application Ser. No. 12/409,315, filed Mar. 23, 2009, titled, "Method and Apparatus for Improving GPS Positioning Using an Embedded Map Database," which is published as US 2011/0241935, provides one approach towards integration, where map information is embedded within a GPS receiver. However, embedding a map database in the GPS receiver itself may lead to bulkier navigation device size. In order to optimize the size of the navigation device, size of the map database itself and/or complexity of the map-matching or navigational algorithms need to be optimized.

Accordingly, techniques and devices for making better accuracy improvements to a navigation receiver's position calculations in degraded signal environments remain desirable, where selective information can be extracted from a map database that is optimized for providing positional correction in unison with a navigational routine executed by the navigation receiver.

SUMMARY OF THE INVENTION

The present invention uses a map database which is created with the view of optimization in terms of size and complexity, so that it can be easily embedded into a navigation chip. The optimized map database is referred to as a "mini-map" database. The mini-map database easily integrates with the position calculation routine. The algorithm for position calculation includes a map-matching component, which is referred to as the "mini-map-matching" (MMM) algorithm, which is implemented on the navigation chip.

In one aspect of the invention, a method for determining location of a navigation device is disclosed, the method comprising: embedding a map database for selected geographic areas into a memory section of a navigation chip that executes a navigation algorithm, wherein the map database comprises a reduced set of map data corresponding to each of the selected geographic areas; calculating an initial location of the navigation device; determining whether the calculated initial location falls within one of the selected geographic areas; initiating a map-matching algorithm executed at a processor included in the navigation chip to calculate a map-matched solution, if it is determined that the calculated initial location falls within one of the selected geographic areas;

determining whether the map-matched solution is acceptable by a map-matching feedback logic included in the navigation algorithm; and, overwriting the calculated initial location of the navigation device with the map-matched solution that indicates the location of the navigation device with improved accuracy.

Application of the present invention includes any navigation system for vehicles and/or pedestrians. The navigation system may include dead-reckoning (DR) sensors, such as inertial sensors, odometers, etc., for further improvement of calculated positional accuracy when satellite signals are degraded due to environmental factors.

BRIEF DESCRIPTION OF THE DRAWINGS

The above and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

Figure 1:
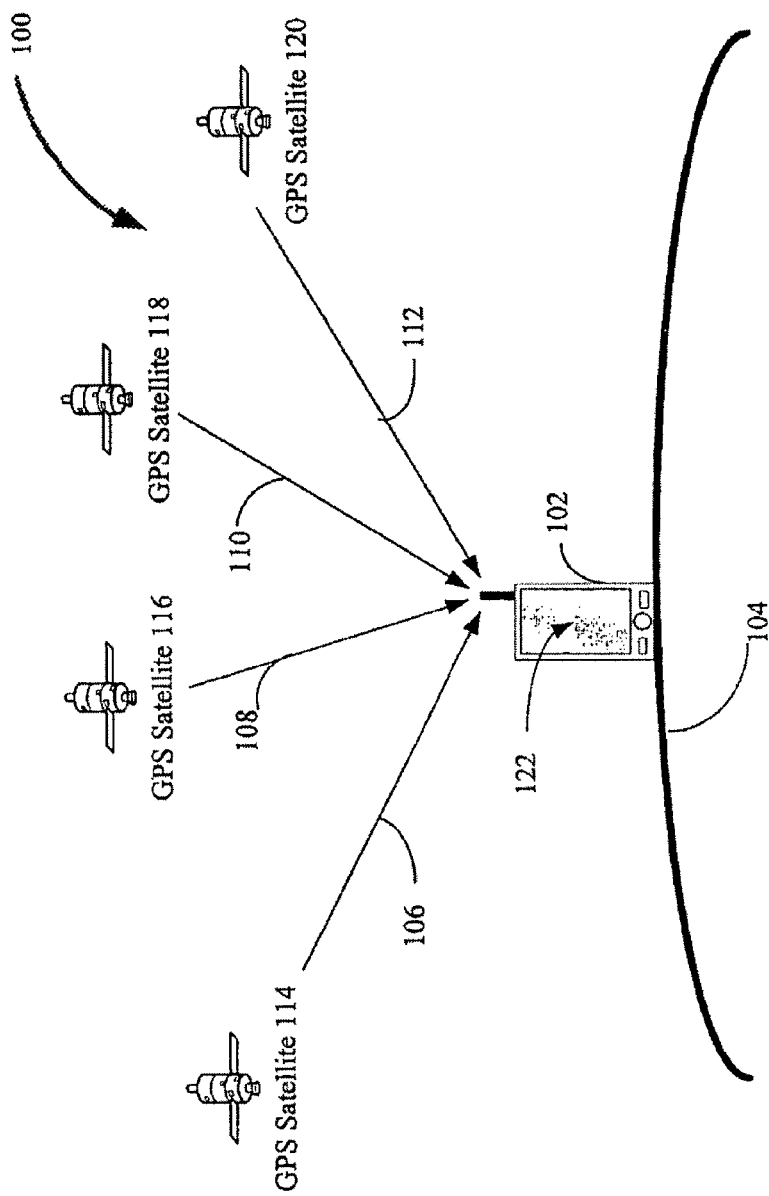
FIG. 1 is a block diagram of an example implementation of principles of the invention.

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

Overview

As discussed in the background section, geographical aiding may be necessary in certain environments when the satellite signals are degraded. It is well known that areas outside of the dense urban areas, and even some urban areas provide enough accuracy for traditional Turn-by-Turn (TBT) navigation. Hence, it is unnecessary to use map database to improve navigation accuracy in these areas. For example, in downtown San Jose may have a topology where additional geographic aiding may not be necessary. The position calculation accuracy however, is degraded in a few, selected highly dense urban canyons (for example, Chicago, San Francisco, New York, Tokyo etc). A mini map database of road segments of these selected areas can be used to greatly improve the navigation performance.

Map-matching is a known geographic-aiding method. However, in the past, mostly full-fledged map-matching was done, and it was done outside the navigation chip, i.e. the map database was stored in a separate location-aiding device. So far, navigation companies have mostly worked independent of the mapping companies. The present inventors have identifies this limitation, and, for the first time proposed the concept of creation of a mini-map database which is embedded on a navigation chip itself.

The existing methods that use a full-fledge map matching approach (with a big map database) done outside of a navigation chip, result in a computationally expensive map matching engine. The full fledge map-matching makes it difficult for a map database to reside on the navigation chip due to limited memory; and, further, makes it difficult to run the map-matching algorithm on the navigation chip due to limited processing speed and the extensive map database to deal with.

When external map-matching is done with a feedback to navigation chip, for example, the approach described in U.S. Pat. No. 7,756,639, may have to compromise the amount of information exchanged across the interface, which makes it suboptimal compared to MMM algorithm implemented on the chip. Therefore, the present invention addresses the need for creating an optimized map database and using it for a map-matching algorithm executed on-chip.

The 'mini' aspect of the mini-map-matching (MMM) approach can be attributed to, among other things, 1) the size of the map database (database includes only information about selected geographic regions, which are already identified as potential 'problem' regions, e.g., urban canyons, underground infrastructure etc.; 2) the simplicity of the information contained in the map database, i.e., mostly street layouts, and 3) the co-location of the map database and the navigation processor, enabling easy integration of the map-matching algorithm within the overall navigation routine.

The navigation system uses the mini-map database to map-match a GPS-only navigation solution, or a combined GPS and Dead Reckoning (DR) navigation solution. The advantages of the present invention include, no or minimal additional cost in hardware, very little additional software, and a small impact on system throughput. The map database can be loaded in, for example, a FLASH memory section embedded in the navigation chip.

General Environment in a Satellite-Based Navigation System for Implementing Example Embodiments of the Present Invention Prior to discussing the present invention, a brief discussion regarding the overall system for satellite-based navigation system is provided.

FIG. 1 illustrates an example system 100 for implementation of embodiments of the invention. Though the satellite system is generically described as GPS system for illustrative purposes, persons skilled in the art will appreciate that the invention is not limited by which type of satellite system is used. For example, GLONASS or a combined GLONASS/GPS system is within the scope of this invention.

As shown in FIG. 1, GPS satellites (i.e. SVs) 114, 116, 118 and 120 broadcast signals 106, 108, 110 and 112, respectively, that are received by receiver 122 in handset 102, which is located at a user position somewhere relatively near the surface 104 of earth. The received data from the satellites is referred to as NSS data in the present application.

Handset 102 can be a personal navigation device (PND, e.g. from Garmin, TomTom, etc.) or it can be a cell or other type of telephone with built-in GPS functionality, or any GPS device embedded in tracking applications (e.g. automotive tracking from Trimble, package or fleet management tracking from FedEx, child locator tracking applications etc). The operation of the PND may optionally be augmented by other devices, such as Dead-Reckoning sensors, Wi-Fi connectivity etc.

Receiver 122 can be implemented using any combination of hardware and/or firmware/software, including GPS chipsets such as SiRFstarIII GSD3tw or SiRFstar GSC3e from SiRF Technology and BCM4750 from Broadcom Corp. and associated firmware/software, as adapted and/or supplemented with functionality in accordance with the present invention, and described in more detail herein. More particularly, those skilled in the art will be able to understand how to implement the present invention by adapting and/or supplementing such chipsets and/or software with the navigation solution improvement techniques of the present invention after being taught by the present specification.

As discussed before, a map database may be used to snap an initial location calculated from the NSS data to a physical geographical object, such as, a road, for a final output displayed by the navigation device. In the present invention, information obtained by using a map-matching algorithm is used to further improve the positional accuracy of the navigation device by incorporating appropriate positional correction to the originally determined location derived from the NSS data. The positional accuracy improvement is done using both a map-matching algorithm and the GPS receiver's navigational routine.

Figure 2:
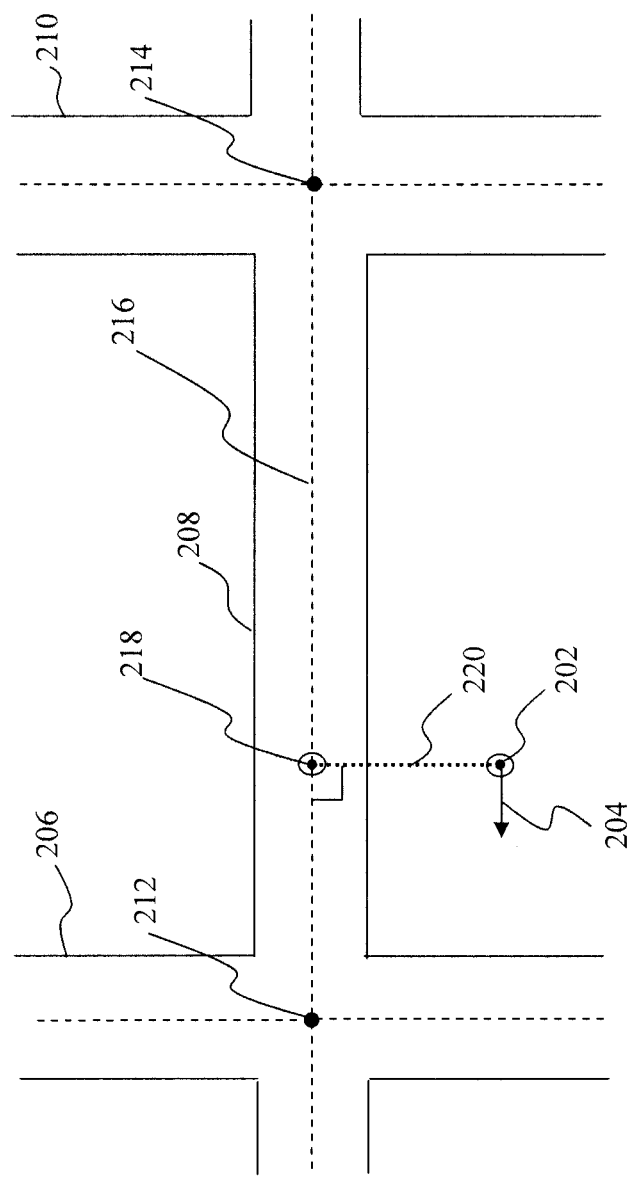
FIG. 2 shows example positional corrections from a line segment.

FIG. 2 shows how a perpendicular positional correction is applied to an initial location 202 derived from the NSS data prior to geographic aiding. The heading direction 204 is known as part of the navigational state information obtained by the GPS receiver. Using the map-matching algorithm, it is determined that the closest road segment is line 216 along a road 208. Intersection points 212 and 214 with cross streets 206 and 210 respectively define the azimuth of the line 216. Width of the road 208 may have been considered to associate a variance to the calculated cross track error 220. The corrected position is at point 218 on the road 208. Note that though in many real cases, roads cross each other at a 90° angle, as shown in FIG. 2, the algorithm is not dependent on the angle between the cross-roads. Also, persons skilled in the art will appreciate that position correction does not have to be in a Cartesian coordinate system, and can encompass radial positional correction and/or a hybrid Cartesian-plus-radial position correction. Examples are discussed in the co-owned US patent publication no. 2011/0257885 to Tuck et al., entitled, "Method and Apparatus for Geographically Aiding Navigation Satellite System Solution."

When a GPS receiver enters a geographical region for which the map database is available, map-matching logic may be initiated. In one embodiment, relevant information from the map database is integrated with a navigational algorithm. A parameter or several parameters of the navigational algorithm may be adjusted based on the cartography information from the map database. The GPS receiver's position is then calculated using the navigational algorithm with the adjusted parameters. The accuracy of the GPS receiver's position calculation is improved through adjustments made to the navigational algorithm because the adjustments made are based on relevant information gleaned from the optimized map database that is additional to the information the GPS receiver extracted from received satellite signals. These corrections or parameter-tweaking can either be applied before or after the navigation algorithm. In this manner, the position of a GPS receiver may be more accurately determined even in degraded signal environments where satellite signals are weak or are otherwise difficult to extract information from, such as in an urban canyon created within a heart of a city where tall obstructing structures are likely to be present in high density. The map database needs to be accessed quickly and efficiently by the GPS receiver so that map information can be used in the real-time position calculations performed by the GPS receiver.

In one embodiment, the embedded map database is stored in non-volatile (e.g. flash, ROM, etc.) memory that is readily accessible by the GPS receiver (e.g. receiver 122). In another embodiment, the embedded map database is stored in on-chip memory on the same chip as the GPS receiver.

Figure 3:
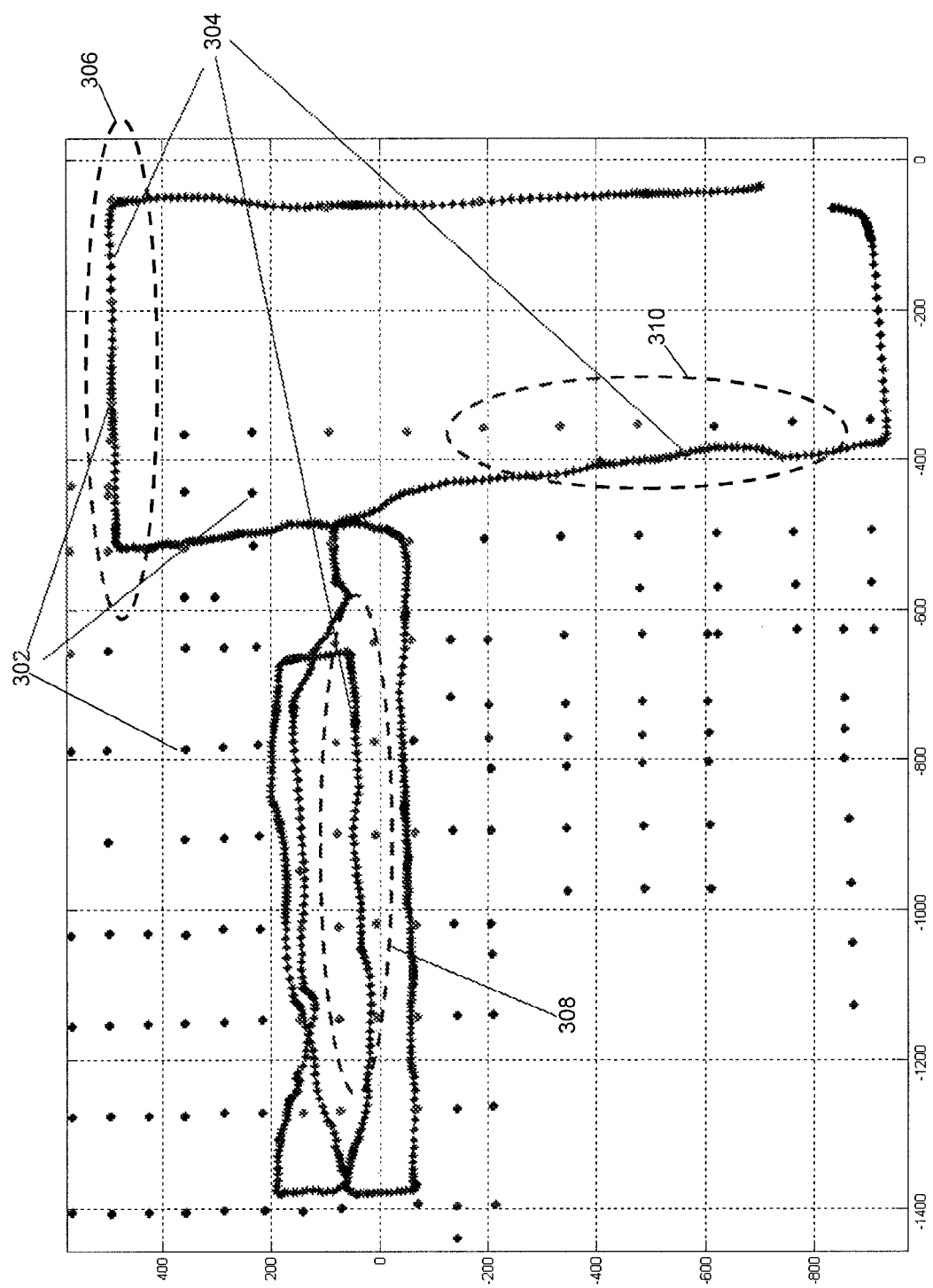
FIGS. 3-4 compare results of the present invention with results of a conventional methodology of position determination.
Figure 4:
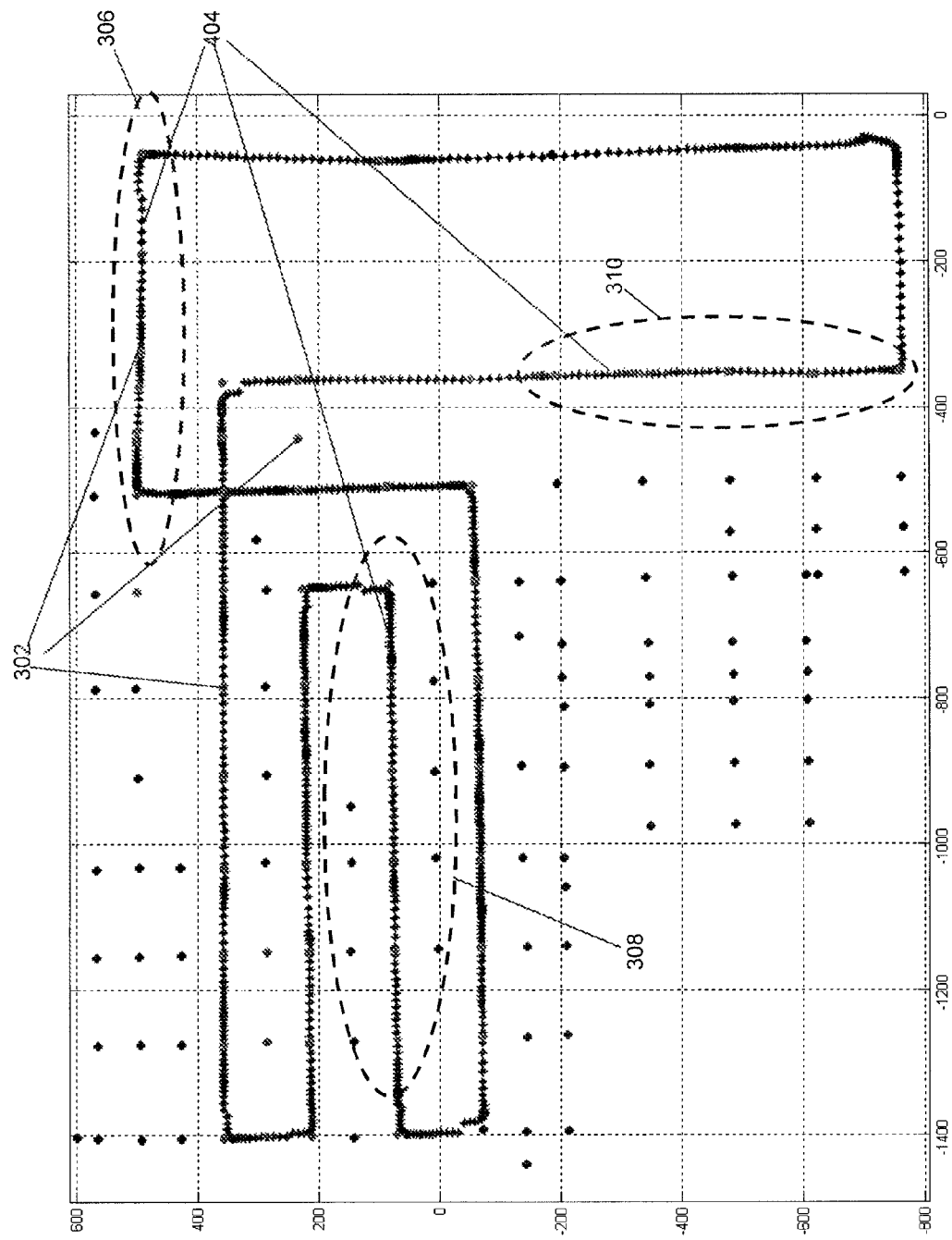

As a proof of concept of the present invention, actual routes in downtown Chicago were navigated, and a mini-map was created. FIGS. 3 and 4 show that using the mini-map and the MMM, effective turn-by-turn navigation can be achieved in a tough urban canyon, such as a part of downtown Chicago.

FIG. 3 represents position calculated using the conventional method of using satellite data with DR sensor, but without using geographical-aiding of the present invention. FIG. 4 represents corrected positions calculated using the present invention's MMM algorithm that uses geographical aiding (i.e. using satellite data, DR sensor and MMM algorithm). For clarity, the superimposition of actual road networks and other geographical objects from the map database are not shown in FIGS. 3-4. The coordinate indices of an actual map of a few city blocks within downtown Chicago are shown on the X and Y axes. The dots 302 in both FIGS. 3 and 4 represent points along the actual segments of a road network, including intersection points. The trace 304 in FIGS. 3 and 404 in FIG. 4 show the calculated position. It is clear that the present invention's algorithm does a better job of snapping a calculated position to an actual road segment, while the calculated positions without MMM algorithm are not always snapped to the actual road segments. For example, within the dashed oval outlines 308 and 310, the calculated positions do not match that well with the actual road segments (FIG. 3) when MMM algorithm is not used, but in FIG. 4, within the same outlines, the matching of the calculated position and the actual road segments is vastly improved, when MMM algorithm of the present invention is used. Persons skilled in the art will also appreciate that the improvement of the positional accuracy will be more prominent in certain geographical locations compared to other locations depending on the level of degradation of the signal, complexity of the road network, arrangement of geographic objects, attributes of the geographic objects (such as, widths of a road), speed of the vehicle/pedestrian, etc. For example, within the dashed oval outline 306 shown in both FIGS. 3 and 4, the improvement of positional accuracy is not that prominent as it is within the dashed oval outlines 308 and 310. This is because the geographical region within the dashed oval outline 306 had more open-sky environment compared to the other regions.

Example Methods of the Present Invention

Figure 5:
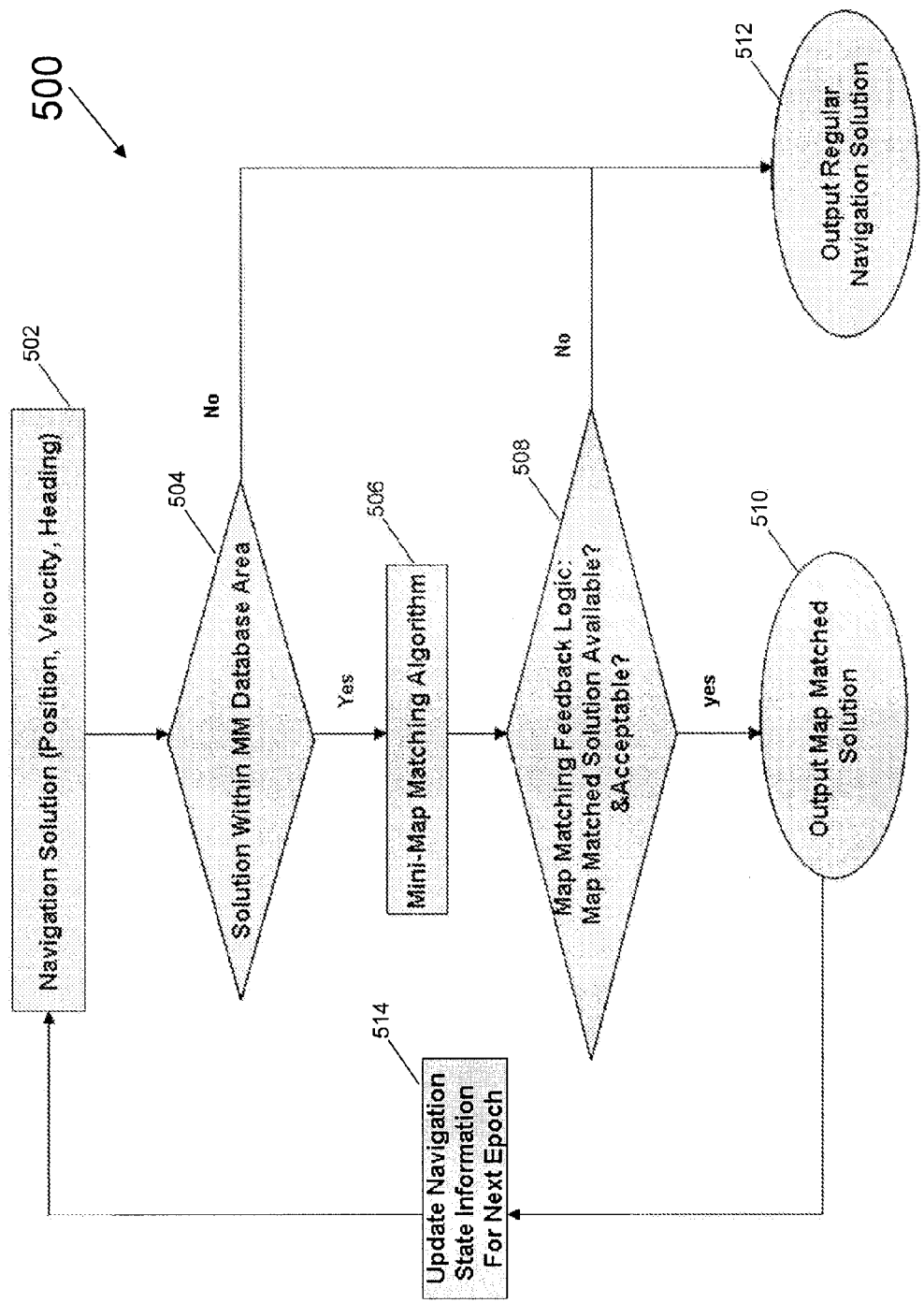
FIG. 5 is a flowchart illustrating an example methodology for outputting a corrected location that can be performed in accordance with aspects of the invention.
Figure 6:
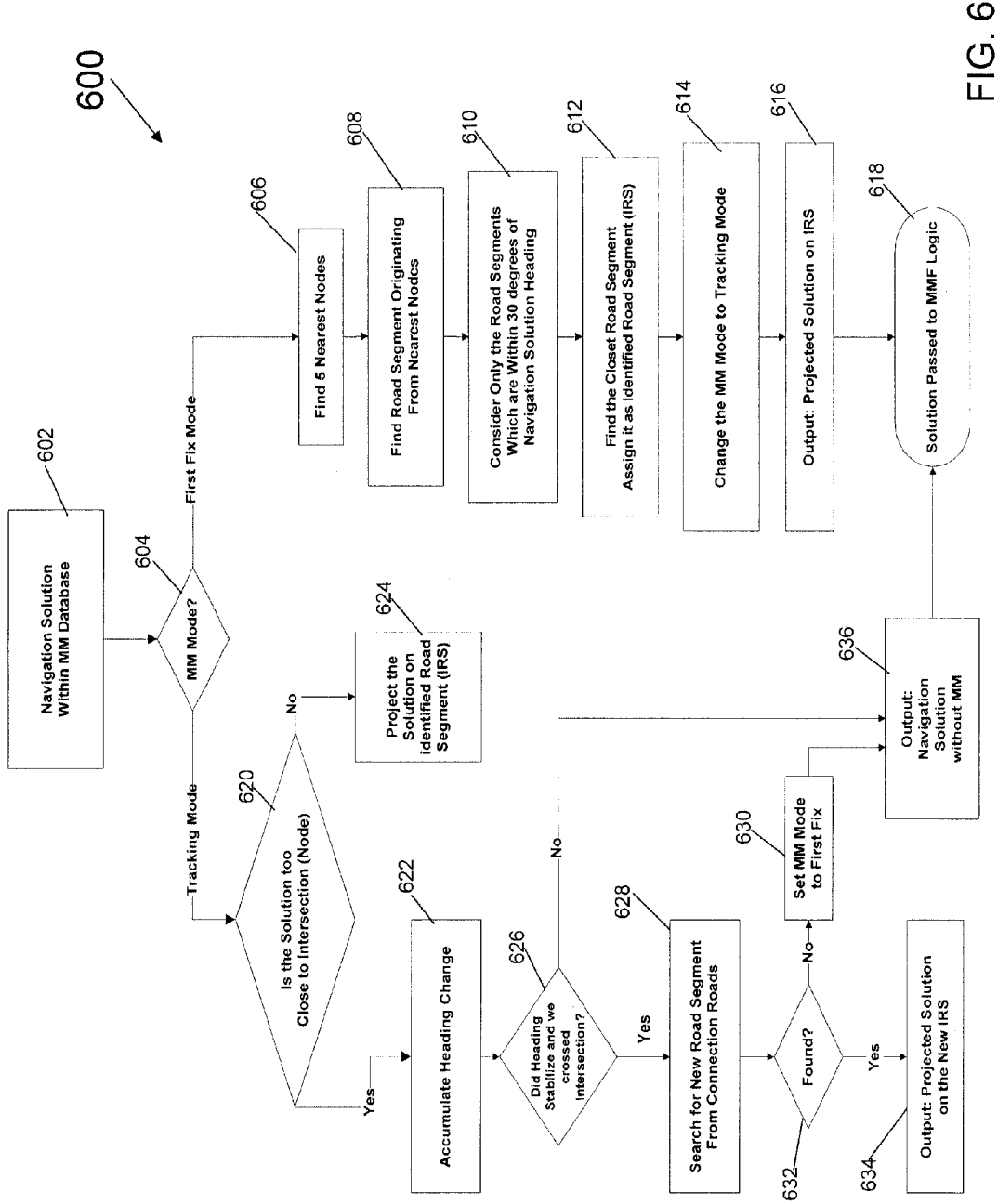
FIG. 6 is a flowchart illustrating example steps leading to mini-map-matching logic used by embodiments of the present invention.
Figure 7:
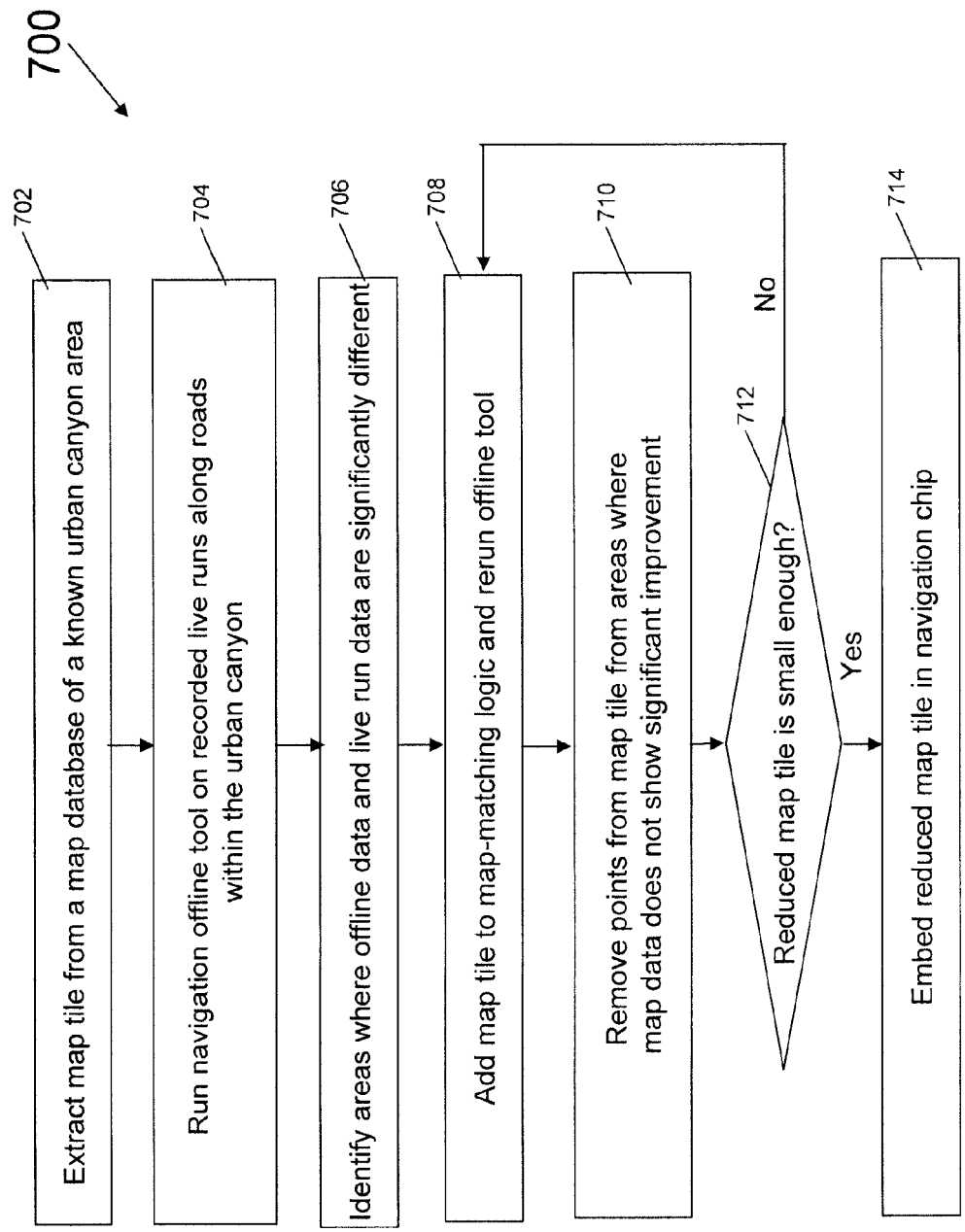
FIG. 7 shows a flowchart illustrating an example of how a mini-map is generated from a regular-sized map database, according to an embodiment of the present invention.

FIGS. 5, 6, and 7 are exemplary flowcharts illustrating the method of improving positional accuracy in accordance with an embodiment of the present invention.

Flowchart 500 in FIG. 5 shows some key steps of an example method on a high level. In step 502, the navigation system computes its solution from position calculated from the satellite signals, velocity, heading (i.e. direction of motion) etc. In step 504, the navigation system checks to see if the calculated solution falls within a predetermined area for which a mini-map database is available. If it is beyond the limits of mini-map database, the navigation system outputs the regular navigation solution, as shown in step 512. On the other hand, if the navigation solution falls in an area covered by mini-map database, then MMM algorithm is activated (step 506) and the system proceeds to generate a map-matched solution. In step 508, this map-matched solution is passed on to map-matching feedback (MMF) logic which decides whether map-matched solution should be accepted or not. If map-matched solution is accepted then it is sent out as the final position in step 510. A previously found navigation state (which will be used in next epoch) is reset to the map-matched solution, as shown in step 514 within the feedback loop that goes back to calculate the navigation solution in step 502.

Details of mini-map-matching logic is shown in the flowchart 600 in FIG. 6.

In step 602, it is determined that the solution computer from satellite data (and optionally using the DR sensor data) falls within an area for which mini-map database is available. Once it is determined that map-matching (MM) mode is to be activated, there are two further options: activating the tracking mode (shown in the left branch of step 604), or activating the first-fix mode (shown in the right branch of step 604).

In the first-fix mode, a plurality of nodes nearest to the calculated initial solution (from satellite data) are selected (in step 606). For illustrative purposes, 5 nodes are mentioned in the flowchart 600, but any number of nodes can be used. The nodes are points included in the mini-map database. In step 608, road segments originating from the nearest nodes are identified. In step 610, a sub-set of road segments is identified based on a predetermined filtering criteria. For example, in flowchart 600, a specific example is shown where only the road segments that are within 30 degrees of the heading of the initial navigation solution are considered. In step 612, the closest road segment is identified from the subset, and that road segment is assigned as the identified road segment (IRS). These steps are part of the "first fix." In step 614, the MM mode is changed to tracking mode, i.e. first fix preceded tracking In step 616, an output is generated, which is the projected solution on IRS (as shown by element 220 in FIG. 2). In step 618, the solution from step 616 is passed on to the MMF logic.

When in step 604, a tracking mode is chosen instead of a first-fix mode, first, in step 620 it is determined if the initial solution calculated from satellite data is too close to a node (or intersection) in the mini-map database. If not, then the initial solution is projected on the IRS to which the initial solution is closest. If the projected solution is too close to a node, then the method proceeds to accumulated heading change (step 622) over a predetermined time period. In step 626, it is determined whether the heading is stabilized, and/or a node (or intersection) is crossed. If that does not happen, then a navigation solution is outputted without further map-matching (step 636). However, if heading does stabilize and/or an intersection is crossed, the method proceeds to step 628, where search for a new road segment is started from roads connected to the node. If a new road segment is found in step 632, that new segment is identified as the IRS, and in step 634, the projected solution on the new IRS is outputted. If a new IRS is not found, in step 630, the map-matching (MM) mode is changed into the first-fix mode (steps 606-616), and a solution is outputted in step 636 without running the MM algorithm. Finally, the solution is passed to the MMF logic (step 618).

If the MMF logic determines that the map-matched solution is acceptable, then the initial location calculated from satellite data only (or from combined satellite-data and DR sensor data) is overwritten by the map-matched solution.

Persons skilled in the art will understand that all the steps of the flowchart 600 may not occur in the sequence shown, additional steps may be introduced, some steps may be skipped, the sequence of the steps may change, and some steps may occur simultaneously, without limiting the scope of the invention. For example, modes other than the first-fix mode and the tracking mode may be designed, or a hybrid first-fix/tracking mode may be designed where selected first-fix and tracking operations are performed. In some embodiments, DR data may be used to first calculate a satellite plus DR solution as the initial location, before a map-matched solution is obtained. In other embodiments, first a map-matched solution is calculated, and DR data may be used to further improve a map-matched solution.

FIG. 7 shows a flowchart 700 which shows example steps of creating a mini-map database from a regular-sized map database. As described in the co-pending US patent publication no. 2011/0257885 to Tuck et al., entitled, "Method and Apparatus for Geographically Aiding Navigation Satellite System Solution," a map database may be divided into units, called 'tiles' in a geographically-aided GPS system. FIG. 7 shows how a mini-map tile is created from a regular map tile.

In step 702, a regular-sized map tile is extracted from a map database of a known urban canyon area. In step 704, data from live runs along roads within the urban canyon area are obtained. The live run data is compared with data obtained by running a navigation offline tool. "Offline" is a tool used to replay captured test runs back through the navigation routine of the GPS chip. Comparison of the live run data and offline data helps in identifying the 'trouble' areas, i.e. areas where the live run data and offline data are significantly different (step 706).

In step 708, the regular map tile is added to mini-map-matching logic and the offline tool is rerun. The points where the execution of the map-matching logic shows no or minimal impact on the original map tile data, are removed to generate the first iteration of the reduced size mini-map tile (step 710). The offline tool is run again and again removing superfluous points until a minimal set of points is achieved that meets the required navigation performance, but is small enough for the allocated memory size of the navigation chip. This is done at the discretion of the person making the map tile. This iterative cycle is shown by the loop starting from the decision block 712.

If the size of the mini-map tile is still too large for the allocated memory space, then optionally more points on the roads can be deleted based on the knowledge of which segments of the roads are less travelled (e.g., alleys, dead ends or cul-de-sacs etc.). The deletion may be done at the discretion of the person making the mini-map tile, or it may be done automatically.

Finally, in step 714, the mini-map tile is embedded in the navigation chip.

The geographical areas to be covered by the mini-map tiles may be pre-selected based on commercial interest. For example, if a GPS-maker is interested in integrating the service for location-aided marketing of products in certain commercially significant urban areas, then those mini-map tiles may get preference over other geographical areas, when the memory size of the navigation chip is limited.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A method implemented by a computer comprising:
   identifying a geographic area where signals from a navigation satellite system are degraded;
   selecting the geographic area as one of a plurality of selected geographic areas for which a respective reduced set of map data is to be included in an embedded map database;
   identifying regular-sized map data corresponding to the geographic area;
   identifying superfluous points in the regular-sized map data that have little or no impact on navigation performance;
   removing the identified superfluous points from the regular-sized map data to produce the respective reduced set of map data for the geographic area, wherein the steps of identifying superfluous points and removing the identified superfluous points are iteratively performed in accordance with anon-volatile memory size of a navigation chip into which the embedded map database is to be embedded; and
   creating, by the computer, the embedded map database using the reduced set of map data.

2. A method according to claim 1, further comprising determining location of a navigation device using the embedded map database and a navigation chip that executes a navigation algorithm, the determining including:
   calculating an initial location of the navigation device using signals from the navigation satellite system received by the navigation chip;
   determining whether the calculated initial location falls within one of the selected geographic areas;
   initiating a map-matching algorithm executed at a processor included in the navigation chip to calculate a map-matched solution, if it is determined that the calculated initial location falls within one of the selected geographic areas;
   determining whether the map-matched solution is acceptable by a map-matching feedback logic included in the navigation algorithm; and
   overwriting the calculated initial location of the navigation device with the map-matched solution that indicates the location of the navigation device with improved accuracy.

3. The method of claim 2, wherein while calculating the initial location, data from a dead-reckoning sensor is utilized.

4. The method of claim 2, wherein data from a dead-reckoning sensor is utilized while calculating the map-matched solution.

5. The method of claim 2, wherein if it is determined that the calculated initial location does not fall within one of the selected geographic areas, then outputting the calculated initial location as the final location of the navigation device.

6. The method of claim 2, wherein the method further comprises:
   updating a navigation state information with the map-matched solution for a next epoch.

7. The method of claim 2, wherein the map-matching algorithm includes one or both of a tracking mode and a first-fix mode.

8. The method of claim 2, wherein the map-matching algorithm is configured to switch between a first-fix mode to a tracking mode.

9. The method of claim 2, wherein the map-matching feedback logic interfaces the map-matching algorithm within the navigation algorithm.

10. The method of claim 2, wherein accuracy of the determined location of the navigation device is further improved by using one or both of Wi-Fi augmentation, and cell-triangulation.

11. The method of claim 1, wherein the reduced set of map data includes one or more of: nodes representing road intersections, nodes representing end points of road segments, nodes representing geographic landmarks; nodes representing meeting point of two or more roads; nodes representing internal points within a traffic plaza; and, lines representing road segments connected to the nodes.

12. The method of claim 1, wherein the step of identifying superfluous points includes running match-mapping logic using the regular-sized map data and live run data corresponding to the geographic area.

13. The method of claim 1, wherein the step of identifying superfluous points includes using knowledge of points in the regular-sized map data corresponding to areas in the geographic area that are not likely to be travelled.

14. The method of claim 1, wherein the regular-sized map data of the geographic area comprises geographic information respectively describing a plurality of different points of a road in the geographic area, and the step of identifying superfluous points includes identifying superfluous ones of the plurality of different points of the road.

15. A navigation device, comprising:
   a navigation chip that executes a navigation algorithm to calculate an initial location of the navigation device using signals received from a navigation satellite system;
   a map database for selected geographic areas embedded into a memory section of the navigation chip, wherein the map database has been created by:
      identifying a geographic area where signals from the navigation satellite system are degraded;
      selecting the geographic area as one of a plurality of selected geographic areas for which a respective reduced set of map data is to be included in the map database;
      identifying regular-sized map data corresponding to the geographic area;
      identifying superfluous points in the regular-sized map data that have little or no impact on navigation performance;
      removing the identified superfluous points from the regular-sized map data to produce the respective reduced set of map data for the geographic area, wherein the steps of identifying superfluous points and removing the identified superfluous points are iteratively performed in accordance with a size of the memory section of the navigation chip into which the map database is to be embedded; and creating the map database using the reduced set of map data; and wherein the navigation chip further determines whether the calculated initial location falls within one of the selected geographic areas; initiates a map-matching algorithm executed at a processor included in the navigation chip to calculate a map-matched solution, if it is determined that the calculated initial location falls within one of the selected geographic areas; determines whether the map-matched solution is acceptable by a map-matching feedback logic included in the navigation algorithm; and, overwrites the calculated initial location of the navigation device with the map-matched solution that indicates the location of the navigation device with improved accuracy.

16. The navigation device of claim 15, wherein the memory section of the navigation chip includes non-volatile FLASH memory coupled to the processor.

17. The navigation device of claim 15, wherein device further comprises a dead-reckoning sensor for further improving accuracy of the calculated location of the navigation device.

18. The navigation device of claim 15, wherein the device further comprises Wi-Fi augmentation for further improving accuracy of the calculated location of the navigation device.

19. The navigation device of claim 15, wherein the device further comprises cell-triangulation augmentation for further improving accuracy of the calculated location of the navigation device.

20. The device of claim 15, wherein the map database comprises a reduced set of map data, including one or more of: nodes representing road intersections, nodes representing end points of road segments, nodes representing geographic landmarks; nodes representing meeting point of two or more roads; nodes representing internal points within a traffic plaza; and, lines representing road segments connected to the nodes.

* * * * *

UNITED STATES PATENT AND TRADEMARK OFFICE
CERTIFICATE OF CORRECTION

| | | |
|---|---|---|
| PATENT NO. | : 9,075,141 B2 | Page 1 of 1 |
| APPLICATION NO. | : 13/315202 | |
| DATED | : July 7, 2015 | |
| INVENTOR(S) | : Syed et al. | |

It is certified that error appears in the above-identified patent and that said Letters Patent is hereby corrected as shown below:

ON THE TITLE PAGE

On Page 2, in Item (56), under "OTHER PUBLICATIONS", in Column 2, Line 1, delete "Syed. Selman" and insert -- Syed, Salman --, therefor.

IN THE SPECIFICATION

In Column 6, Line 48, delete "FIGS. 3" and insert -- FIG. 3 --, therefor.

IN THE CLAIMS

In Column 9, Line 40, in Claim 1, delete "anon-volatile" and insert -- a non-volatile --, therefor.

In Column 9, Line 45, in Claim 2, delete "A" and insert -- The --, therefor.

In Column 12, Line 13, in Claim 20, delete "The device" and insert -- The navigation device --, therefor.

Signed and Sealed this
Sixteenth Day of February, 2016

Michelle K. Lee
*Director of the United States Patent and Trademark Office*